Sept. 29, 1931.  L. JAENICHEN  1,825,317
SCALE
Filed Aug. 6, 1927  4 Sheets-Sheet 1
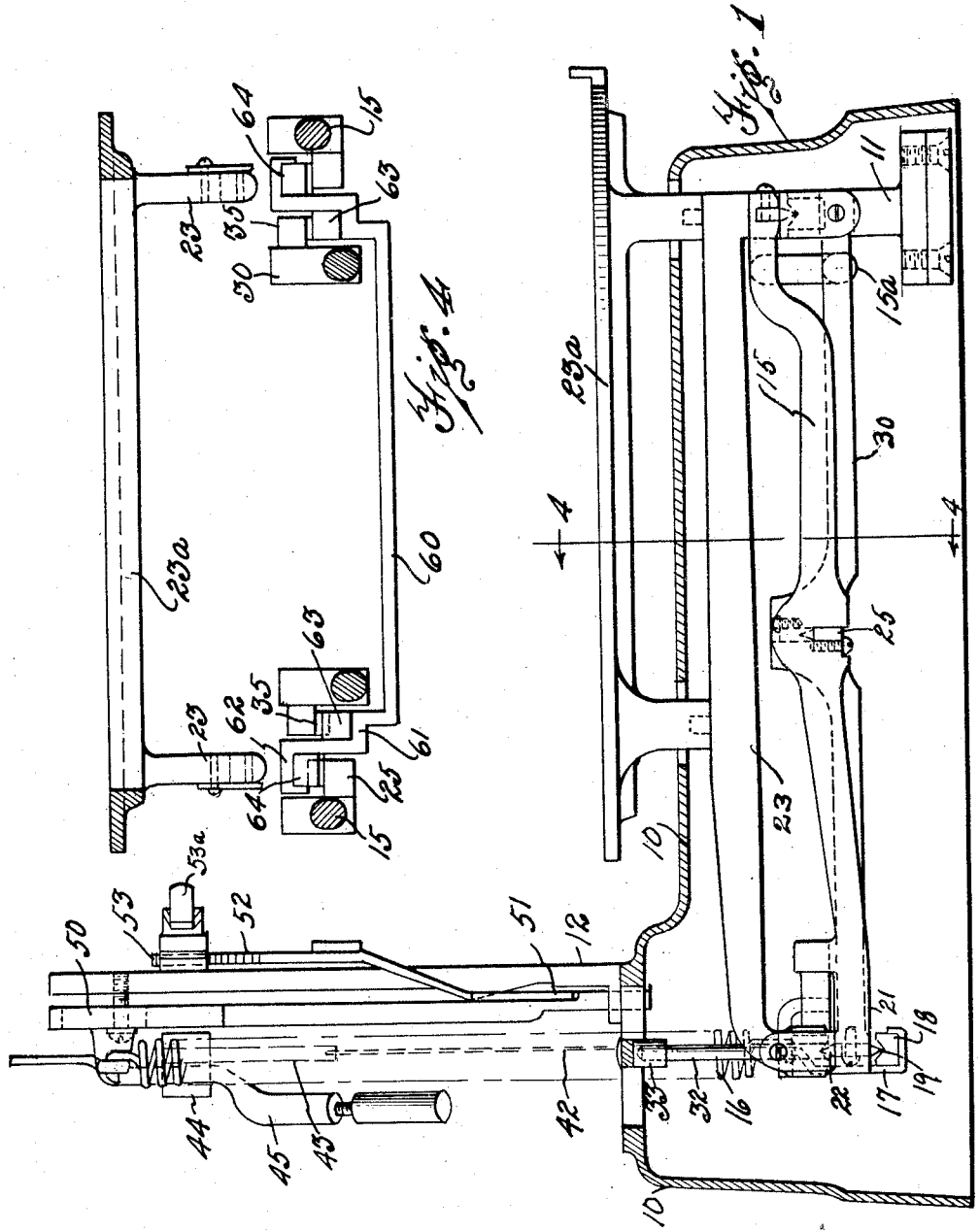
INVENTOR.
Louis Jaenichen
BY Francis D. Hardesty
ATTORNEY.

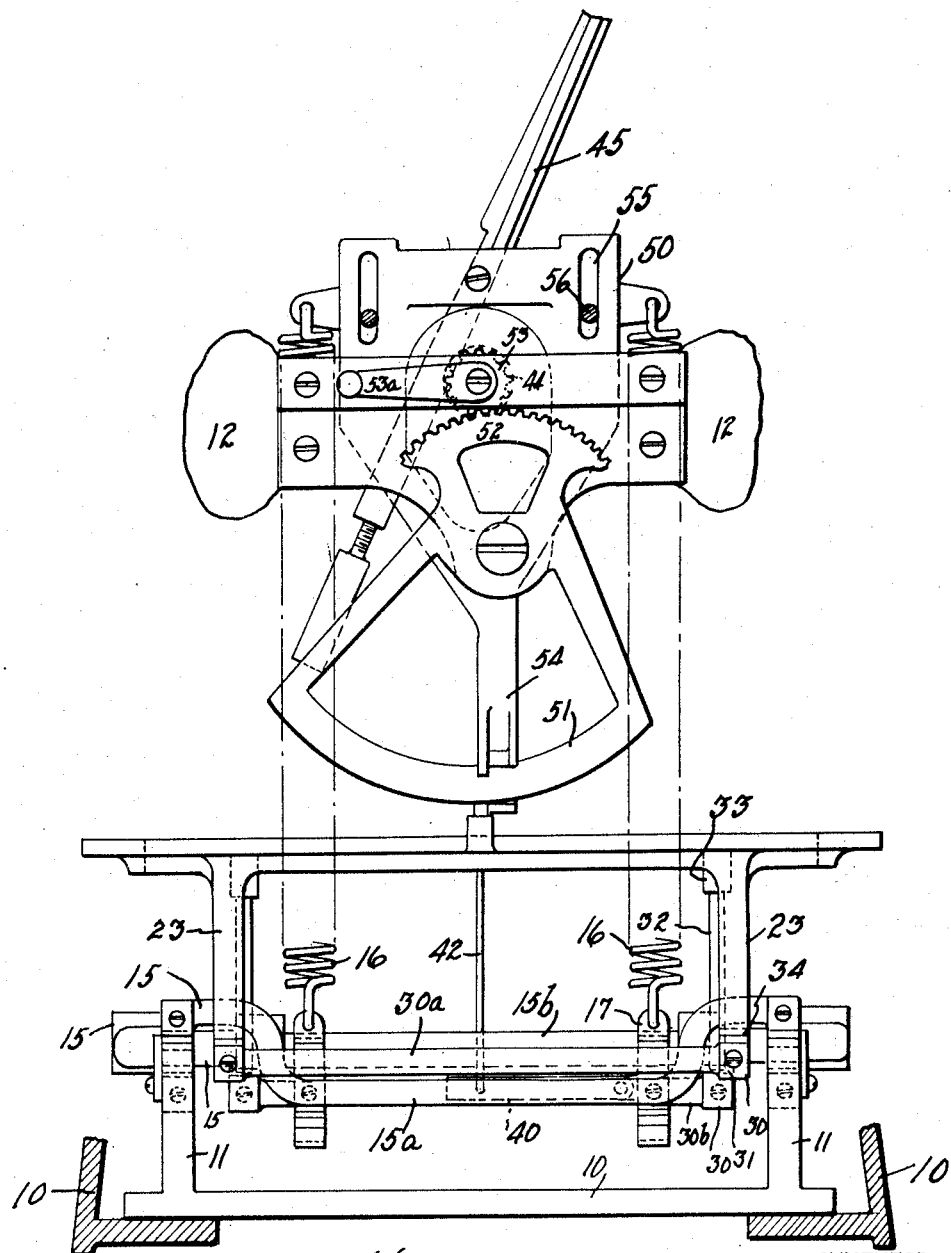

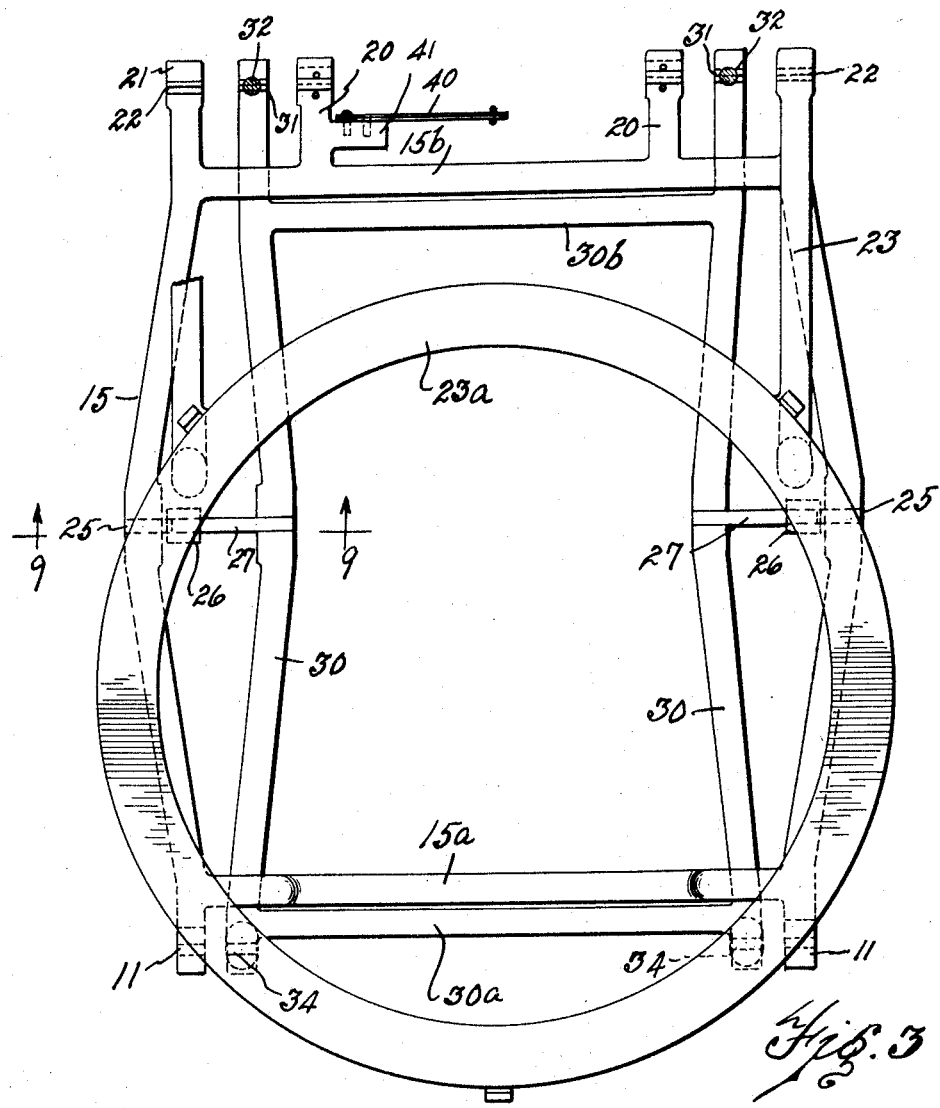
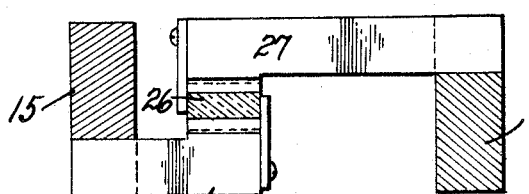

Sept. 29, 1931.    L. JAENICHEN    1,825,317
SCALE
Filed Aug. 6, 1927    4 Sheets-Sheet 4
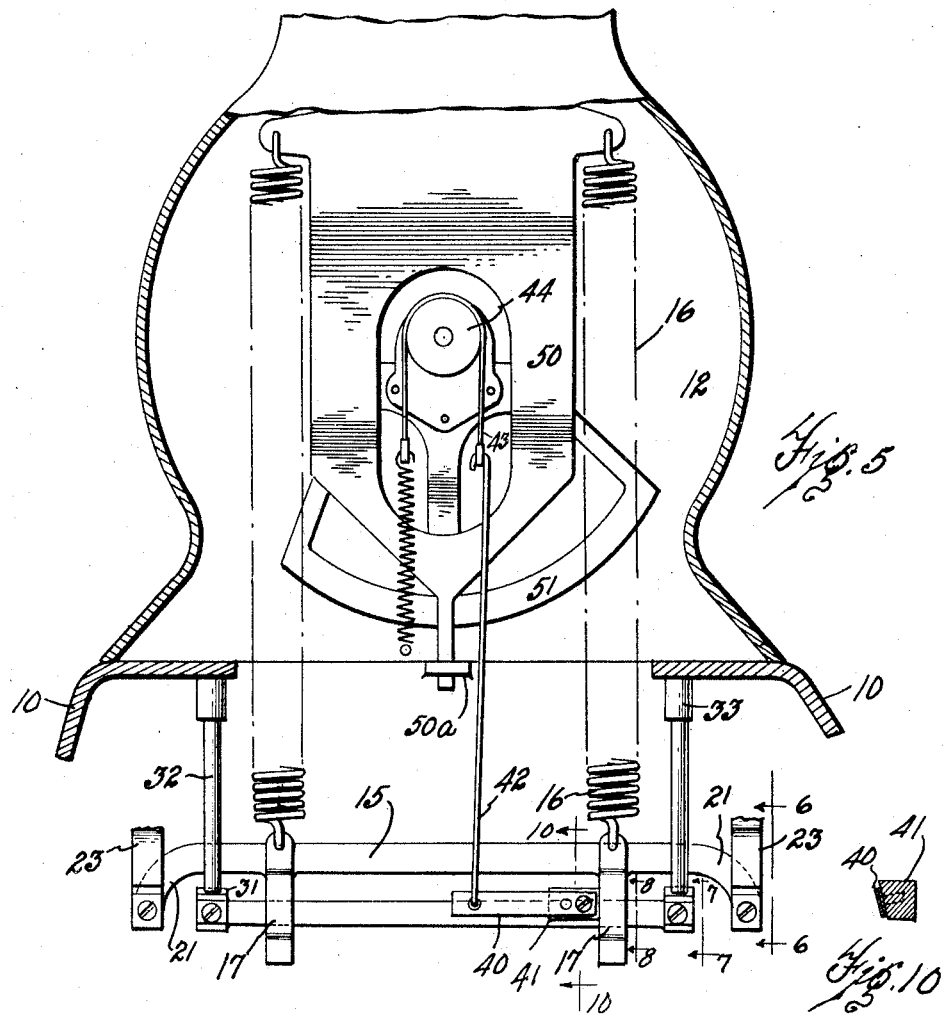
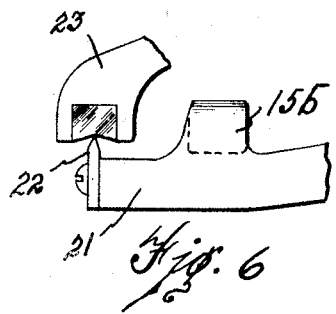
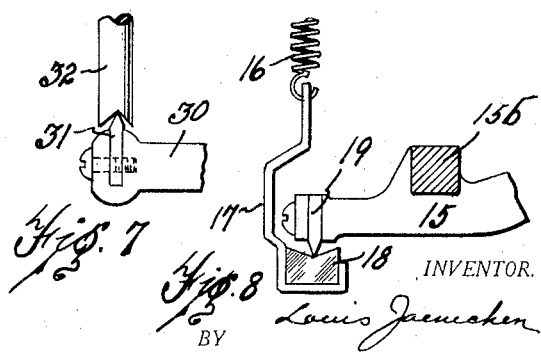
INVENTOR.
Louis Jaenichen
BY
Francis D. Hardesty
ATTORNEY.

Patented Sept. 29, 1931

1,825,317

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

SCALE

Application filed August 6, 1927. Serial No. 211,188.

The present invention relates to weighing scales and particularly to platform scales of computing type.

Among the objects of the invention is a scale of simple lever ratio which shall be accurate in function, simple in construction, and economical to construct and adjust.

Other objects will readily appear to those skilled in the art upon reference to the following description and accompanying drawings in which:—

Fig. 1 is a side elevation of the weighing mechanism with the housing removed;

Fig. 2 is a front elevation thereof;

Fig. 3 is a plan view of the lever system;

Fig. 4 is a section of a modified form as if taken on line 4—4 of Fig. 1;

Fig. 5 is a rear elevation of the indicator actuating mechanism;

Fig. 6 is an enlarged side view of end of one arm 21 of lever 15 and end of one coacting arm of platform frame 23 on line 6—6 of Fig. 5;

Fig. 7 is a similar view showing the hold down means for one of the levers on line 7—7 of Fig. 5;

Fig. 8 is a similar view of the lower end of one of the spring connections on line 8—8 of Fig. 5;

Fig. 9 is an enlarged section on line 9—9 of Fig. 3; and

Fig. 10 is a section on line 10—10 of Fig. 5.

Referring to the drawings, the base 10 carries inside and across its front end the main lever stand 11, (Fig. 2) and upon and across its back end the frame 12, which frame holds the chart, not shown, and also the indicator and spring mechanisms as hereinafter specified.

Pivoted at the front end on lever stand 11, is a main lever 15, the other end being supported by the load resisting springs 16, to which are attached stirrup members 17 having bearings 18 for the knife edges 19 carried in lever 15 (Fig. 8). The back end of lever 15 is provided with four continuing arms 20 and 21 and knife edges 19 are carried in arms 20.

Arms 21 are provided also with knife edges 22 adapted to coact with bearings in the back end of the platform frame 23.

Lever 15 is also provided midway between its end bearings with knife edges 25 upon which rest bearings 26 carried in laterally projecting arms 27 fixed in secondary lever 30.

Secondary lever 30 at its back end has knife edges 31 acting upwardly against pins 32 which are pointed at their upper ends and coact with socket members 33 fixed in base 10. The pins 32 and sockets 33 are so fitted as to permit a small forward and backward movement of the lower ends of the pins 32. The front end of lever 30 is provided with knife edges 34 upon which rest bearings in the front end of platform frame 23, so that the latter is carried by the back end of the main lever 15 and the front end of the secondary lever 30.

The main and secondary levers and outline of positions of the lever bearings of the platform frame are all substantially rectangular, the two sides of the main lever being connected by cross members 15a and 15b, those of the secondary lever by cross members 30a and 30b, and those of the platform frame by the circular portion 23a.

In addition to the arms 20 and 21 at the back end of lever 15, there is also an arm 41 for the laterally projecting thermostat 40; to the thermostat is secured a link 42 extending upwardly to the indicator mechanism. This link has attached at its upper end a strap 43 passing over and secured to a small drum 44 fixed to the hub carrying the indicator or pointer 45, acting in the conventional manner to indicate on the chart the weight upon the platform. The thermostat 40, shown in Fig. 3 is preferably a bimetallic strip so mounted, on lever 15, as to move the lower end of link 42 toward the fulcrum of lever 15 and also raise the link 42 relative to the pivot edge plane of said lever with any increase of temperature, and to move the lower end of link 42 away from the fulcrum of lever 15 and also lower the link relative to the pivot edge plane of lever 15 with any decrease of temperature to compensate for changes in the corresponding resistance and length of the springs due to such changes in temperature.

The aforesaid raising and lowering of the link according to the bending of the plane of the thermostat by change of temperature is secured by forming the face of the lug 41, on the lever 15, vertically on a sufficient angle with the plane of the pivot edges of said lever thereby holding the normal plane of the thermostat at a sufficient vertical angle to the pivot edge plane of said lever to produce the raising and lowering of the links 42, when change of temperature curves the thermostat.

As shown in Figs. 1, 2 and 5 the load resisting springs 16 are secured at their upper ends upon a plate 50 which may be lifted up or let down by means of a cam member 51. This member 51 is formed as a part of a gear segment 52 rotatable by means of a small gear 53 provided with a suitable crank 53a. These latter parts are so mounted on frame member 12 fixed to the base that cam 51 coacts with a suitable slide carried by a downward extension 54 on plate 50. The latter is also provided with a suitable guide 50a in frame 12 and may also be slotted as at 55 for passage of guide pins 56 fixed in frame 12. Rotation of the gear 53 moves the cam 51 to one side or the other in relation to arm 54 and thereby moves plate 50 vertically together with the upper anchorage of springs 16. By this means the pointer may be moved to the zero point to compensate for containers.

Fig. 4 shows a slight modification of the intermediate bearings in levers 15 and 30.

In the form described above, the bearing for knife edge 25 is fixed in lever 30. In the form shown by Fig. 4, both of the levers are provided with knife edges, that on lever 15 being shown at 25 and that on lever 30 at 35, and the bearings therefor carried in a cross member 60 having at its end the shoulders 61 and hooked over portions 62. The shoulders 61 carry the bearings 63 for knife edge 35 and the hooks carry the bearings 64 for knife edges 25.

It will be noted that the two levers 15 and 30, and the frame 23 are all of the same length between their end bearings. It will also be noted that the intermediate bearings are half way between these end bearings. Therefore, a unit weight on the platform will exert a unit of pull on the springs 16 and this is one of the features of the scale.

Now having described the invention and the preferred form of embodiment thereof, it is to be understood that the said invention is to be limited not to the specific details herein set forth, but only by the scope of the claims which follow:

I claim:—

1. In a platform scale, a support, a platform and levers pivotally connected to said support and to said platform, said levers intersecting each other and pivotally connected to each other at the point of intersection, the distances from said intersection point to said points of connection of said levers to said supports and platform being the same.

2. In a platform scale, a main lever, a pair of spaced aligned bearings supporting said lever at one end, a pair of spaced load resisting elements supporting the other end of the lever, spaced aligned bearings on said main lever intermediate its ends, a secondary lever of equal length with the main lever and supported intermediate its ends by said intermediate bearings on said main lever, hold down bearings for that end of the secondary lever adjacent the load resisting elements, a platform having bearings on the free end of said secondary lever and on the main lever adjacent to and substantially in the same vertical plane with said load resisting elements and weight indicating means operated by said levers.

3. In a platform scale, a rectangular weighing lever system comprising a main lever supported with two bearings at each end and having two side bearings midway of its length, a secondary lever of the same length supported at its middle on said main lever side bearings and provided at each end with a pair of pivots for upward thrust, a pair of oscillating members coacting with one pair of said upward thrust pivots and a platform support of equal length with said levers pivoted at one end on the other pair of upward thrust pivots of the secondary lever and a pair of upward thrust pivots on the main lever upon which the other end of said platform support is pivoted.

4. In a platform scale a main lever, a load resistance connected thereto a secondary lever, and a platform, pivoted at one end on said main lever and at the other end on said secondary lever, the distance between the fulcrum pivot and the load resistance connection of the main lever being equal to the distance between the fulcrum pivot of the main lever and the platform supporting pivot of said main lever.

LOUIS JAENICHEN.